United States Patent [19]
McConnell

[11] 3,731,972
[45] May 8, 1973

[54] SAFETY SEAT

[75] Inventor: Howard B. McConnell, Pontiac, Mich.

[73] Assignee: Sam Allen & Son, Pontiac, Mich.

[22] Filed: Oct. 4, 1971

[21] Appl. No.: 186,329

[52] U.S. Cl.................................297/216, 297/390
[51] Int. Cl...............................................B60r 21/10
[58] Field of Search...........................297/216, 390

[56] References Cited

UNITED STATES PATENTS

| 2,823,730 | 2/1958 | Lawrence | 297/216 |
| 3,640,572 | 2/1972 | Doehler | 297/390 |
| 2,102,979 | 12/1937 | Smith | 297/216 |
| 3,466,091 | 9/1969 | De Grusso | 297/390 |
| 3,610,679 | 10/1971 | Amato | 297/216 |

FOREIGN PATENTS OR APPLICATIONS

| 1,318,721 | 1/1963 | France | 297/390 |
| 244,903 | 12/1925 | Great Britain | 297/216 |
| 1,301,910 | 7/1962 | France | 297/216 |

*Primary Examiner*—James T. McCall
*Attorney*—Dale A. Winnie

[57] ABSTRACT

A safety seat construction for automotive and other vehicle use which includes mechanical means for causing the vehicle seat bottom to be raised at the front and the seat back to be tilted backwardly, and which includes in combination therewith a shoulder restraining device that is mounted on the seat back to hold a person against the seat back as it is tipped rearwardly.

3 Claims, 6 Drawing Figures

PATENTED MAY 8 1973  3,731,972

INVENTOR.
Howard B. McConnell
BY
Dale A. Winnie
ATTORNEYS

SAFETY SEAT

BACKGROUND OF THE INVENTION

Almost all suggestions in regard to driver and passenger safety in automotive vehicles have centered around the use of safety belts and shoulder harnesses.

Unfortunately such means, in attempting to restrain the human body against the decelerating force of a collision, often create bodily injuries and chest or shoulder injuries are all too common, even though more serious injuries are avoided by the use of the restraining means presently known and used.

A great deal has been done to lower a person's center of gravity, as he sits in a car seat. To some extent this is due to the lower profile of todays cars which requires that one sit lower down and back in a seat and not so vertically upright. By having ones posterior down in the seat and the forward edge of the seat fitted more up under the thighs, for comfort, and the seat back at more a rearwardly inclined angle, part of the deceleration force is directed down and into the vehicle seat and there is less of a tendency to lift a person out of his seat and have him thrown forward.

One drawback, though, is that this causes a person's legs to be stretched out more in front of him and there is a natural tendency to lock one's knees, in anticipation of a collision, and to lean forward which puts one in the position of a bell-crank lever that is even more subject to the inertial forces and of being lifted right up and out of the seat and thrown forward.

Besides providing for a relatively low center of gravity for a person sitting in a car, there needs to be some way to prevent the knees from being locked and, if possible, to dissipate or absorb part of the deceleration force by some relative movement of the car seat so that the person is not torn or thrown so violently apart from it. The car seat is, after all, the most padded and protective part of the car, and the greatest safety and protection should be in keeping a person in it.

Some efforts have been made along these lines heretofor, but they have involved too great a change in construction or too much in the way of operative mechanism that could go wrong. There have been vehicle seats which were made to fold up or back, to drop a person into a more protective position, and those which allowed some seat movement forward against some forms of damper or under a like restraint. But, they have not been properly designed or engineered.

SUMMARY OF THE INVENTION

The present invention relates to a safety seat construction for automotive and other vehicles wherein the deceleration force is used, as it occurs, to lift the seat bottom at the front and drop it at the back part so that the seat back tilts backwardly and the occupant's center of gravity is maintained low and into the seat bottom for maximum safety and protection.

The preferred embodiment makes use of a bell-crank form of lever arrangement connected to the front of the seat and extending forward and made pivotal near the engine fire wall. The seat itself is lifted at the front and caused to move forward and down into a depression in the floor as the seat back is tilted rearwardly. This occurs gradually as the deceleration force builds, so that there is no violent up-setting of the person in the seat but just a slow rocking back and down against and into the protection of the seat bottom.

Other forms of the invention included guided track ways to accomplish the same thing. And one, in particular, makes use of a floor depression and restraining spring shackle to obtain the desired result.

In combination with the operating mechanism of the proposed safety seat, there is also a new and novel form of shoulder restraint which is provided on the seat and is adjustable for comfort and practical use. It includes arm-like members swival connected in the top of the seat back and with padded ends to engage over and gently retain ones shoulder back against the seat, where the head is also closer to the head rest.

These and other features will be described in the detailed description of the embodiments shown by the drawings, which follow hereinafter.

DESCRIPTION OF ILLUSTRATED EMBODIMENTS

Figure 1:
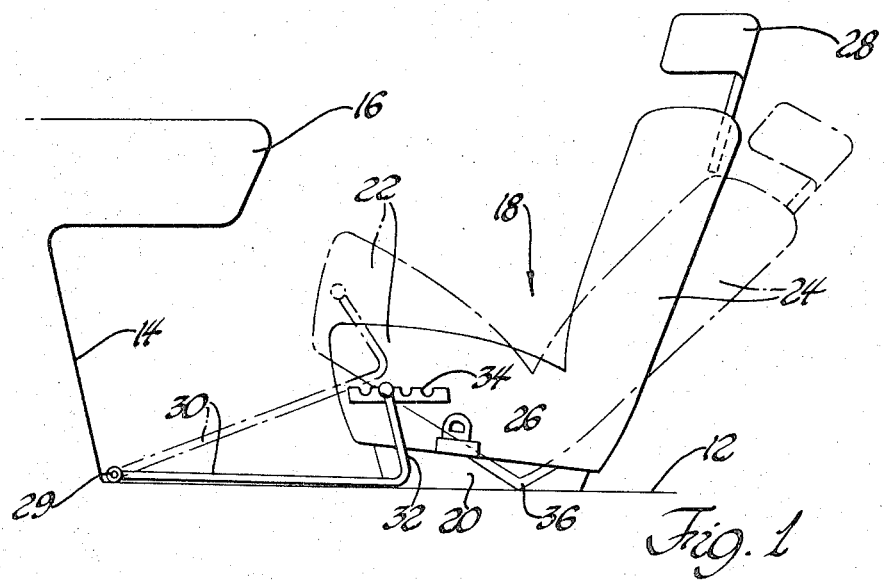
FIG. 1 is a side plan view of an automobile seat in a vehicle which includes the features of the present invention and showing the seat in its activated position in dotted outline.

A front seat area, in a vehicle, is shown in the first drawing figure with the vehicle floor line identified 12, the fire wall 14 shown separating the passenger area from the engine compartment, and a protruding padded dash board 16.

A vehicle seat 18 is shown on a mounting pad 20 and although not specifically shown it includes such mechanism as enables it to be adjusted fore and aft in the usual manner of user comfort. The vehicle seat includes a seat bottom portion 22 and a seat back portion 24 which are connected together in the usual manner to allow the seat back to be folded forward, for easier access to a back seat area, by the release of some form of safety catch, not shown. It might also be of the type that can be folded back and down to lie relatively parallel to the seat bottom but would have some form of safety catch again so that this could not happen inadvertently. In essence, at least for the purpose of describing the present invention, the seat bottom 22 and seat back portions 24 are locked and held in the relative positions shown so that movement of one fore and aft, or in being tilted or racked, will effect the other in a like manner.

A mounting bracket 26 for one part of a safety seat belt is shown on one side of the seat portion 22 and a head rest 28 is shown on the seat back portion 24.

Pivotally connected near the fire wall 14, as at 29, and extending towards the seat bottom 22, along the floor line 12, lie a couple of lever arm members 39, on each side of the seat, and with a bell-crank arm 32 that connects the bars to the seat bottom. A fixture 34 on the seat is shown to schematically represent a means that will allow fore and aft adjustment of the seat and still allow the crank arm connection. In actual use, other means might be used such as having the lever arms of two telescoping self-latching parts that would automatically compensate for seat adjustment. These lever arm members with their bell-crank ends are of such stock and gage material that they are capable of withstanding the load and performing the function hereinafter attributed to them. They may lay on top of the floor carpeting or just below an open seam, or a break-away seam, in the carpeting where they will be hidden and out of the way. A slight depression in the floor panel to receive them is also conceivable, if they are to be less obvious.

The mounting pad 20 under the seat bottom 22 includes a depression or recess 36 just forward of its back end which will be appreciated later as receiving the back lower edge of the seat bottom and helping to effect the safety seat movement desired. There is also some form of break-away connection between the seat bottom and the mounting pad to allow their relative separation. None is necessary but in actual production use it is obvious that something of this kind would be used.

When a vehicle having the disclosed safety seat construction hits an obstruciton sufficient to create a certain predetermined reactionary force, the inertial effect is to cause the vehicle seat to move forward, against the resistance of the lever and crank arm members 30-32 which, in turn, causes the front end of the seat bottom portion 22 to be raised, as to the dotted line position shown, and the seat back portion 24 to be tilted back, as also shown in dotted outline. The seat can not move forward against the resistance of the lever arms and as a consequence must pivot in the manner shown, which drops the seat bottom into the depression 36 and causes it to tilt over backward.

As the front edge of the seat is lifted, the knees of the person on the seat are prevented from locking, his center of gravity is lowered as the seat back tilts, and any other forward momentum of ther person is down against and into the soft seat bottom. The person is held in the seat by a seat belt and shoulder restaining means (described later) but the movement described is not violent but almost as gradual as the inertial force that causes one to feel they are sliding off their seat. And, in fact, such a deceleration before impact can be engineered into the disclosed system so that a person is actually more prepared for a collision, if desired.

Figure 2:
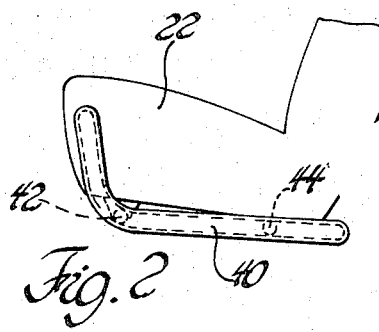
FIG. 2 is a fragmentary side plan view of another seat, with a different arrangement to actuate it.
Figure 3:
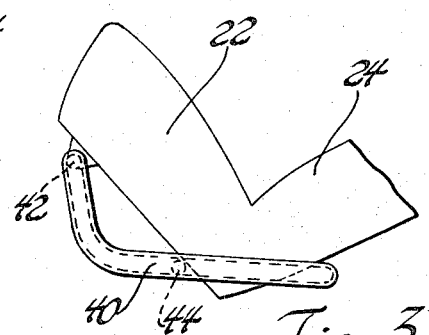
FIG. 3 is the same as the last drawing figure with the vehicle seat shown in its tilted and dropped disposition.

FIGS. 2 and 3 show a track system that may be used to accomplish a similar result. Guide rails 40 are provided along each side of the seat and rollers 42 at the front and 44 at the back enable the seat to ride forward and tilt as shown in the second of the two figures. The front end of the seat bottom is lifted and the back end is dropped, because of the position of the rollers 44 at the back, as the seat back is tilted backwardly.

Figure 4:
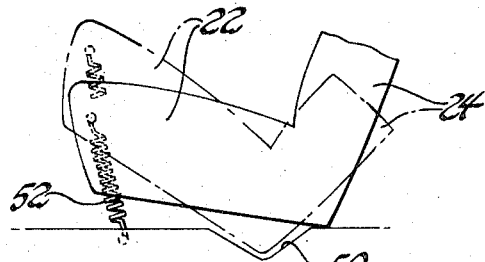
FIG. 4 is a fragmentary side plan view of still another seat with another different operating arrangement.
Figure 5:
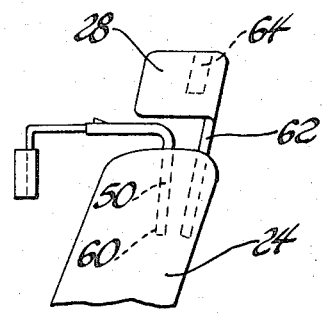
FIG. 5 is a fragmentary side plan view of the top part of a seat back showing the head rest and new shoulder restraining means of the present invention.
Figure 6:
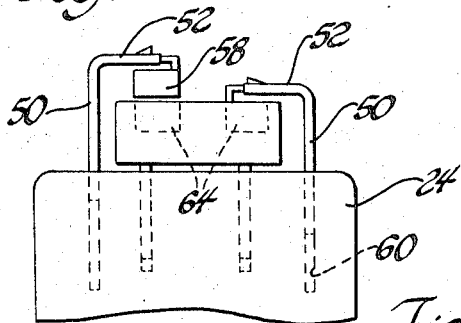
FIG. 6 is a front view of the same seat back, head rest and shoulder restraining means (in storage position) as described for the preceding drawing figure.

FIG. 4 shows another arrangement wherein the seat movement forward causes it to ride down into a depression 50 in the floor pan while a compressive spring loaded mechanism 52 forces the front end of the seat bottom upwardly and together they cause the desired tilting movement.

The last two drawing figures show the shoulder restraining means of the present invention for use in combination with the safety seat which has been described. It includes a pair of vertically raisable and lowerable posts 50 each with an arm 52 and a telescoping extension 54, with a ratchet catch 56, that have a depending shoulder pad 58 on their ends. They are received in fittings 60 in the seat back 24, much like the supporting posts 62 for the head rest, so that they can be raised or lowered and swivaled relatively out in front of a person sitting with their back against the seat back and then telescoped into a rachet locked position of relative comfort and reasonably assured restraint.

It will be appreciated that this particular shoulder restraining device is not intended to take the load of the usual roof mounted shoulder harness strap. Instead, it is merely to retain a person comfortably against the seat back and in position to tilt back with the safety seat. The padding is for comfort and for the first initial load before the safety seat is released and tips back, but nothing more severe than this. They are not intended to tie or lock a person in the seat.

The head rest 28 is shown as formed to include pockets 64 within which the padded ends of the shoulder restrains can be placed. In the last drawing figure one of the shoulder restraints is shown so housed while the other is raised and positioned but has not yet been lowered into such a retained position.

I claim:

1. Safety seat construction for automotive vehicles, and comprising; a seat supporting structure fixed to a vehicle floor, a vehicle seat provided on said supporting structure and relatively adjustable fore and aft thereon, a depression provided in said supporting structure forwardly of the back edge thereof and of the formost adjusted position of said vehicle seat thereon, and lever arm members connected to the vehicle floor considerably forward of said vehicle seat and to said vehicle seat on each side and near the front thereof for precluding the forward adjustment of the back edge of said seat to within said depression and for effecting a backward tilting of said vehicle seat, a lifting of the front edge thereof, and a dropping of the back edge of said seat into said depression in response to predetermined inertial and decelleration forces occuring at the inception of vehicle accident situations.

2. The safety seat construction of claim 1, said lever arm members having their forward ends extending along the vehicle floor and including bell crank extensions adjacent said vehicle seat extending upwardly on each side thereof and for fixed pivotal connection thereto in the various adjusted positions thereof.

3. Safety seat construction for an automotive vehicle including a vehicle seat provided therewithin and mounted on a supporting structure on the vehicle floor which allows relative fore and aft adjustment of said seat, said vehicle seat including a seat bottom and a seat back inseparably connected to said seat bottom and precluded from being inadvertently folded backwardly separate and apart therefrom, a pair of lever arm members disposed on the vehicle floor and extending from said seat bottom forwardly, said arm members having their forward ends pivotally connected to the vehicle floor and including bellcrank extensions at their other ends connected to the seat bottom on opposite sides thereof and a distance above the floor level, a depression in said supporting structure for said seat forwardly of the back edge of said seat bottom and formed to receive and have said seat bottom back edge dropped therein, and means connecting said seat bottom to said supporting structure and which are responsive to predetermined inertial forces on said seat and decelleration forces as regards the vehicle for effecting a forward movement of said seat against the resistance of said lever arms causing a lifting of the front edge of said seat bottom and a dropping of the back edge thereof into said depression for rocking said seat backwardly and tilting said seat back rearwardly and down.

* * * * *